Aug. 8, 1950 H. C. PYE 2,518,178

ANTISIDETONE AND LINE BALANCING SUBSTATION CIRCUITS FOR TELEPHONE SYSTEMS

Filed Nov. 5, 1947

INVENTOR.
Harold C. Pye
BY
Smith, Olsen & Baird
Attys.

Patented Aug. 8, 1950

2,518,178

UNITED STATES PATENT OFFICE 2,518,178

ANTISIDETONE AND LINE BALANCING SUBSTATION CIRCUITS FOR TELEPHONE SYSTEMS

Harold C. Pye, Oak Park, Ill., assignor to Automatic Electric Laboratories, Inc., Chicago, Ill., a corporation of Delaware Application November 5, 1947, Serial No. 784,278

8 Claims. (Cl. 179—81)

The present invention relates to anti-sidetone and line balancing substation circuits for telephone systems, and more particularly to improvements in such substation circuits of the general type shown in U. S. Patent No. 1,254,475, granted to George A. Campbell on January 22, 1918.

As developed at length in the Campbell patent mentioned, a telephone substation circuit of the type noted comprises a transmitter, a receiver, a balancing network consisting in its simplest form of an auxiliary resistance, and a multi-winding induction coil or transformer which in combination with a connected telephone line, are so designed that: the transmitter and the receiver are conjugate so that there is negligible sidetone in the receiver in consequence of the actuation of the transmitter by sound waves; the telephonic energy delivered by the transmitter is a maximum for a given line having a definite impedance; and the amount of energy delivered by the telephone line to the substation is a maximum when the impedance of the substation as seen from the telephone line is numerically equal to the impedance of the line.

In actual practice, a telephone substation circuit of the type noted only partially realizes the advantages mentioned, since the design of the telephone substation circuit is based upon the assumption that, in use, it will be associated with a telephone line having a particular or average impedance; whereas, in fact, the telephone substation circuit may be used with any one of a number of different types of telephone lines. Moreover, in order fully to realize the advantages mentioned, the impedance matching discussed above must be over the entire audio frequency band of the telephone substation circuit and the connected telephone line, and not just at a particular or average frequency.

Accordingly, it is a general object of the present invention to provide a telephone substation circuit of the anti-sidetone and line balancing variety that is especially designed to be used with a particular type of telephone line and which embodies facility for substantially matching the impedance thereof with the impedance of the connected telephone line over the entire audio frequency band.

Another object of the invention is to provide a telephone substation circuit of the type noted, including a frequency variable reactor, and having an impedance-frequency response characteristic that closely matches that of the connected telephone line.

A further object of the invention is to provide in a telephone substation circuit of the type noted, an improved and economical disposition of the circuit elements thereof.

A still further object of the invention is to provide a telephone substation circuit of the type noted that is of improved connection and arrangement.

Further features of the invention pertain to the circuit elements of the telephone substation circuit; whereby the above-outlined and additional operating features thereof are attained.

Figure 1:
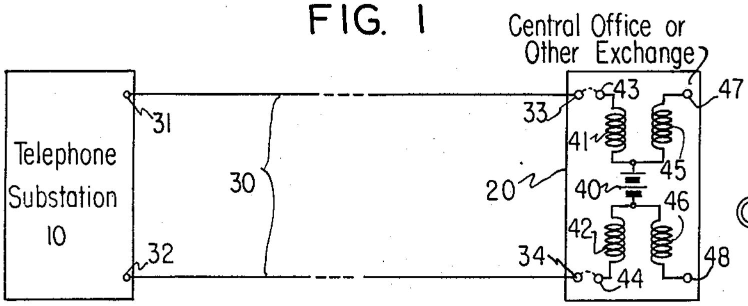
Figure 2:
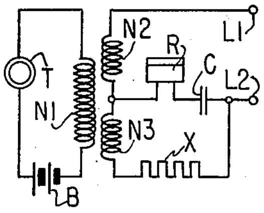
Figure 3:
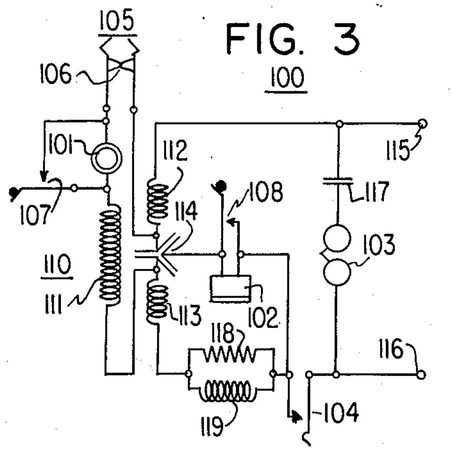
Figure 4:
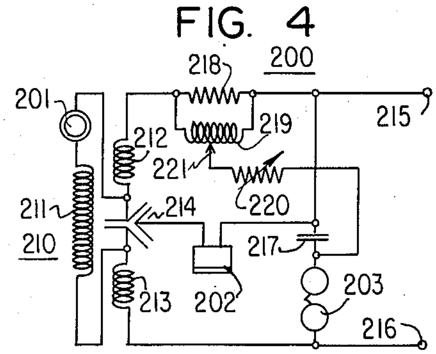
Figure 5:
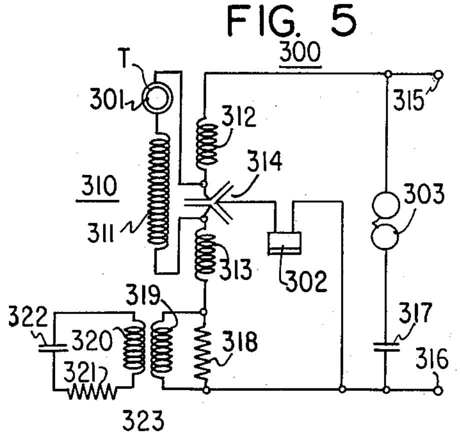
Figure 6:
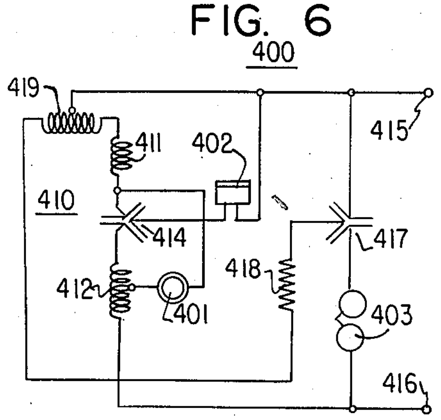

The invention, both as to its organization and method of operation, together with further objects and advantages thereof, will best be understood by reference to the following specification taken in connection with the accompanying drawing, in which Figure 1 is a schematic diagram of a typical telephone system comprising a telephone substation and a central office or other exchange interconnected by a telephone line; Fig. 2 is a schematic diagram of a typical anti-sidetone and line balancing substation circuit embodying the fundamental features of the Campbell patent mentioned; Fig. 3 is a schematic diagram of an anti-sidetone and line balancing substation circuit embodying the features of the present invention; Fig. 4 is a schematic diagram of a modified form of anti-sidetone and line balancing substation circuit embodying the features of the present invention; Fig. 5 is a schematic diagram of another modified form of anti-sidetone and line balancing substation circuit embodying the features of the present invention; and Fig. 6 is a schematic diagram of a further modified form of anti-sidetone and line balancing substation circuit embodying the features of the present invention.

Referring now more particularly to Fig. 1 of the drawing, there is illustrated a telephone system comprising a telephone substation 10, which is adapted to incorporate an anti-sidetone and line balancing substation circuit embodying the features of the present invention, as well as a central office or other exchange 20 and an interconnecting telephone line 30. The end of the telephone line 30 at the telephone substation 10 is connected to two terminals 31 and 32, to which the substation circuit, not shown, is also connected; while the end of the telephone line 30 at the exchange 20 is connected to two terminals 33 and 34. The exchange 20 comprises a current source of battery 40, the two poles of which are connected via battery supply coils 41 and 42 to two terminals 43 and 44, respectively; and also connected via battery supply coils 45 and 46 to two other terminals 47 and 48, respectively. The two terminals 43 and 44 are adapted to be connected by suitable link equipment, not shown, to the two terminals 33 and 34 terminating the telephone line 30; and the two terminals 47 and 48 are adapted to be connected by suitable link equipment to two other terminals terminating another telephone line extending to another telephone station, all not shown; and similarly, the pair of terminals 43, 44 is adapted to be interconnected by the link equipment, not shown, to the pair of terminals 47, 48 in order to complete a telephone connection between the telephone substation 10 and the other telephone station, not shown.

Referring now to Fig. 2 of the drawing, the anti-sidetone and line balancing telephone substation circuit there illustrated is of the type shown in the Campbell patent mentioned and is designed for a local battery telephone substation. This telephone substation circuit comprises a transmitter T, a receiver R, a multi-winding induction coil or transformer including three individual windings N1, N2, and N3, and a line balancing network X in the form of a resistor. The transmitter T, the winding N1 and a current source B, in the form of a battery, are connected in series in a local circuit; the line winding N2 and a direct current blocking condenser C are connected in series with the receiver R across line terminals L1 and L2; and the winding N3 and the network X are connected in shunt to the series connected receiver R and the condenser C.

In accordance with the Campbell patent, the network X is proportioned with respect to the particular telephone line with which the circuit is to be used or with respect to a telephone line of some assumed average impedance; and if the telephone line with which the telephone substation circuit is actually used is not of the assumed impedance, mismatch will result reflecting itself in increased sidetone in the receiver R. Moreover, if the telephone line to which the terminals L1 and L2 are connected is of a type that has a variable impedance over the audio frequency band, mismatch at certain frequencies results reflecting itself in increased sidetone in the receiver R.

Referring now to Fig. 3 of the drawing, there is illustrated a telephone substation circuit of the anti-sidetone and line balancing type 100 embodying the features of the present invention; this telephone substation circuit being of the common battery variety and especially designed to be connected to a long telephone line of the open-wire type having a fairly high resistance, a low capacitive reactance, and a considerable inductive reactance. Accordingly, the telephone line mentioned has an impedance-frequency response characteristic presenting a fairly high impedance at low audio frequencies, a high impedance at intermediate audio frequencies, and a very high impedance at high audio frequencies; the impedance curve rising sharply between low and intermediate audio frequencies, rising gradually between intermediate and high audio frequencies, and then flattening out toward the highest audio frequencies. The telephone substation circuit 100 comprises a transmitter 101, a receiver 102, a ringer 103, a hook-switch 104, and a dial 105 of the finger wheel type provided with a pair of impulsing contacts 106 and two sets of off-normal springs 107 and 108. Also the telephone substation circuit 100 comprises a multi-winding induction coil or transformer 110 provided with three individual windings 111, 112 and 113, as well as a three-plate coupling condenser 114, two line terminals 115 and 116, and a ringer condenser 117. Finally, the telephone substation circuit 100 comprises a balancing network in the form of a resistor 118 and a multiple connected inductance element 119. In the telephone substation circuit 100 the ringer 103 is connected directly in series with the ringer condenser 117 across the line terminals 115 and 116; that are, in turn, connected to the telephone line of the character described. The receiver 102 is normally supported upon the hook-switch 104; and when the receiver 102 is removed therefrom, the hook switch 104 is operated in order to connect the transmitter 101 and the receiver 102 to the line terminals 115 and 116. More particularly, a circuit may be traced from the first line terminal 115 via the second winding 112, the pair of impulsing contacts 106, the transmitter 101, the first winding 111, the third winding 113, the resistor 118 and the multiple connected inductance element 119, and the hook-switch 104 to the second line terminal 116; whereby the transmitter 101 is supplied with direct current from the connected telephone line. Also a path may be traced between the adjacent terminals of the second and third windings 112 and 113, respectively, via first and second plates of the three-plate coupling condenser 114; and a multiple path may also be traced between the first and second plates mentioned of the three-plate coupling condenser 114 via the pair of impulsing contacts 106, the transmitter 101 and the first winding 111. Finally, one terminal of the receiver 102 is connected to the third plate of the three-plate coupling condenser 114; whereas the other terminal of the receiver 102 is connected directly to the junction between the resistor 118 and the inductance element 119 at the hook-switch 104.

When the finger wheel of the dial 105 is operated away from its normal rotary position, the sets of off-normal springs 107 and 108 are operated; the set of off-normal springs 107 completing a path for short-circuiting the transmitter 101, and the set of off-normal springs 108 completing a path for short-circuiting the receiver 102. Subsequently, when the finger wheel of the dial 105 is returned to its normal rotary position, the sets of off-normal springs 107 and 108 are re-operated in order to open the short-circuiting paths mentioned. During the return of the finger wheel of the dial 105, the set of impulsing contacts 106 are operated in accordance with the registered digit to transmit a corresponding series of impulses over the above traced circuit extending between the line terminals 115 and 116 and consequently over the line conductors of the connected telephone line.

After a connection has been established between the telephone station at which the telephone substation circuit 100 is disposed, when the person thereat speaks into the transmitter 101, signal currents traverse the local circuit including the transmitter 101, the first winding 111, the second and first plates of the three-plate coupling condenser 114 and the pair of impulsing contacts 106; whereby corresponding signal voltages are induced in the second and third windings 112 and 113, respectively. The signal voltages induced in the windings 112 and 113 cause a signal current to traverse a circuit including the first and second plates of the three-plate coupling condenser 114, the resistor 118 and the multiple connected inductance element 119, and the hook-switch 104 and thence via the line terminals 115 and 116 over the line conductors of the connected telephone line. The impedance of the balancing network comprising the resistor 118 and the multiple connected inductance element 119 matches the impedance of the connected telephone line; and the receiver 102 and the transmitter 101 are connected to the telephone line mentioned in conjugate relation, whereby no substantial sidetone appears in the receiver 102. On the other hand, a signal current on the line conductors of the connected telephone line traverses primarily the circuit including the second line terminal 116, the hook-switch 104, the receiver 102, the path between the third and first plates of the three-plate coupling condenser 114, the second winding 112, and the first line terminal 115; whereby the receiver 102 responds.

As previously noted, the telephone line to which the telephone substation circuit 100 is connected is of the open-wire type having a fairly high resistance, a low capacitive reactance and a considerable inductive reactance; whereby the impedance of the connected telephone line varies with the frequency of the signal currents, the impedance increasing substantially with increasing frequencies up to a predetermined value established primarily by the resistance of the connected telephone line at the higher end of the audio frequency band. Accordingly, in the design of the telephone substation circuit 100, the resistor 118 has a very high resistance and the inductance element 119 has a fairly high resistance and a high inductive reactance. Accordingly, at the lower end of the audio frequency band, the balancing network comprising the resistor 118 and the multiple connected inductance element 119, like the connected telephone line, has a fairly high impedance. At intermediate frequencies in the audio frequency band, the impedance of the balancing network is increased as the inductive reactance of the inductive element 119 becomes effective; whereby the impedance of the telephone substation circuit 100 is increased, just as is that of the connected telephone line. Finally, at the upper end of the audio frequency band, the inductive reactance of the inductive element 119 becomes very substantial; whereby the impedance of the telephone substation circuit 100 is, in fact, primarily established by the resistance of the resistor 118; the impedance being further increased, which circumstance also prevails on the connected telephone line. Accordingly, it will be understood that the initial impedance of the telephone substation circuit 100 matches that of the connected telephone line, and that the impedance of the telephone substation circuit 100 is increased, like that of the connected telephone line, with frequency over the audio frequency band. Thus the impedance of the telephone substation circuit 100 substantially matches that of the connected telephone line over the entire audio frequency band; whereby the advantages of the anti-sidetone and line balancing arrangement are realized over the entire audio frequency band.

Referring now to Fig. 4 of the drawing, there is illustrated a modified telephone substation circuit of the anti-sidetone and line balancing type 200 embodying the features of the present invention; this telephone substation circuit being of the common battery variety and especially designed to be connected to a short telephone line having a low resistance, a low capacitive reactance and a low inductive reactance. Accordingly, the telephone line mentioned has an impedance-frequency response characteristic presenting a low impedance at low audio frequencies, a moderate impedance at intermediate audio frequencies and a low impedance at high audio frequencies; the impedance curve rising fairly sharply between the lowest audio frequencies and the lower intermediate audio frequencies, falling more gradually between the higher intermediate audio frequencies and the lower high audio frequencies, and then flattening out toward the highest audio frequencies. The telephone substation circuit 200 comprises a transmitter 201, a receiver 202, a ringer 203, a multi-winding induction coil or transformer 210 provided with three individual windings 211 and 212 and 213, as well as a three-plate coupling condenser 214, two line terminals 215 and 216 and a ringer condenser 217. Finally, the telephone substation circuit 200 comprises a balancing network in the form of a first resistor 218 and a multiple connected inductance element 219, as well as a variable second resistor 220 provided with an adjustable tap connecter 221 associated with the inductance element 219. In the telephone substation circuit 200 the ringer 203 is connected directly in series with the ringer condenser 217 across the line terminals 215 and 216; that are, in turn, connected to the telephone line of the character described. The receiver 202 is normally supported upon a hook-switch, not shown; and when the receiver 202 is removed therefrom, the hook-switch is operated in order to connect the transmitter 201 and the receiver 202 to the line terminals 215 and 216. More particularly, a circuit may be traced from the first line terminal 215 via the first resistor 218 and the multiple connected inductance element 219, the second winding 212, the transmitter 201, the first winding 211, and the third winding 213 to the second line terminal 216; whereby the transmitter 201 is supplied with direct current from the connected telephone line. Also a multiple path may be traced from the first line terminal 215 via the right-hand portion or leg of the inductance element 219, the adjustable tap connector 221, the adjustable second resistor 220, and the ringer 203 to the second line terminal 216. Further, a path may be traced between the adjacent terminals of the second and third windings 212 and 213, respectively, via first and second plates of the three-plate coupling condenser 214; and a multiple path may also be traced between the first and second plates mentioned of the three-plate coupling condenser 214 via the transmitter 201 and the first winding 211. Finally, one terminal of the receiver 202 is connected to the third plate of the three-plate coupling condenser 214; whereas the other terminal of the receiver 202 is connected directly to the junction between the first resistor 218 and the multiple connected inductance element 219 at the first line terminal 215.

After a connection has been established between the telephone station at which the telephone substation circuit 200 is disposed, when the person thereat speaks into the transmitter 210, signal currents traverse the local circuit including the transmitter 201, the first winding 211 and the second and first plates of the three-plate coupling condenser 214; whereby corresponding signal voltages are induced in the second and third windings 212 and 213, respectively. The signal voltages induced in the windings 212 and 213 cause a primary signal current to traverse a circuit including the first and second plates of the three-plate condenser 214, the first resistor 218 and the multiple connected inductance element 219 and thence via the line terminals 215 and 216 over the line conductors of the connected telephone line; also these signal voltages induced in the windings 212 and 213 cause a secondary signal current to traverse a multiple circuit including the first and second plates of the three-plate condenser 214, the left-hand portion or leg of the inductance element 219, the adjustable tap connector 221, the adjustable second resistor 220 and the ringer 203. The impedance of the balancing network comprising the first resistor 218 and the multiple connected inductance element 219 and the adjustable second resistor 220 matches the impedance of the connected telephone line; and the receiver 202 and the transmitter 201 are connected to the telephone line mentioned in conjugate relation, whereby no substantial sidetone appears in the receiver 202. On the other hand, a signal current on the line conductors of the connected telephone line traverses primarily the circuit including the second line terminal 216, the third winding 213, the second and third plates of the three-plate coupling condenser 214, the receiver 202 and the first line terminal 215; whereby the receiver 202 responds.

As previously noted, the telephone line to which the telephone substation circuit 200 is connected is short having a low resistance, a low capacitive reactance and a low inductive reactance; whereby the impedance of the connected telephone line varies with the frequency, of the signal currents the impedance first increasing and then decreasing with increasing frequencies in the audio frequency band. Accordingly, in the design of the telephone substation circuit 200, the first resistor 218 has a moderate resistance and the inductance element 219 has a low resistance and a moderate inductance and the second resistor 220 is adjustable and has a fairly high resistance. Accordingly, at the lower end of the audio frequency band, the balancing network, like the connected telephone line, has a low impedance. At intermediate frequencies in the audio frequency band, the impedance of the balancing network is increased as the inductive reactance of the inductance element 219 becomes effective, just as is that of the connected telephone line. Finally, at the upper end of the audio frequency band, the inductive reactance of the inductance element 219 becomes substantial; whereby the impedance of the telephone substation circuit 200 is, in fact, established by the resistance of the first and second resistors 218 and 220; the impedance being reduced, which circumstance also prevails on the connected telephone line. Accordingly, it will be understood that the initial impedance of the telephone substation circuit 200 matches that of the connected telephone line, and that the impedance of the connected telephone substation circuit 200 is first increased and then decreased, like that of the connected telephone line, with increasing frequency over the audio frequency band. Thus the impedance of the telephone substation circuit 200 substantially matches that of the connected telephone line over the entire audio frequency band; whereby the advantages of the anti-sidetone and line balancing arrangement are realized over the entire audio frequency band.

Referring now to Fig. 5 of the drawing, there is illustrated another modified telephone substation circuit of the anti-sidetone and line balancing type 300 embodying the features of the present invention; this telephone substation circuit being of the common battery variety and especially designed to be connected to a short telephone line having a low resistance, a low capacitive reactance and a low inductive reactance. Accordingly, the telephone line mentioned has an impedance-frequency response characteristic presenting a low impedance at low audio frequencies, a moderate impedance at intermediate audio frequencies, and a low impedance at high audio frequencies; the impedance curve rising fairly sharply between the lowest audio frequencies and the lower intermediate audio frequencies, falling more gradually between the higher intermediate audio frequencies and the lower high audio frequencies, and then flattening out toward the highest audio frequencies. The telephone substation circuit 300 comprises a transmitter 301, a receiver 302, a ringer 303, a multi-winding induction coil or transformer 310 provided with three individual windings 311, 312 and 313, as well as a three-plate coupling condenser 314, two line terminals 315 and 316 and a ringer condenser 317. Finally, the telephone substation circuit 300 comprises a balancing network in the form of a first resistor 318, a transformer 319 having a primary winding 319 and a secondary winding 320, the primary winding 319 being connected in multiple to the first resistor 318. Also the secondary winding 320 is provided with a load circuit in the form of a second resistor 321 and a capacitive reactor 322 connected in series circuit relation thereacross. In the telephone substation circuit 300, the ringer 303 is connected directly in series with the ringer condenser 317 across the line terminals 315 and 316; that are, in turn, connected to the telephone line of the character described. The receiver 302 is normally supported upon a hook-switch, not shown; and when the receiver 302 is removed therefrom, the hook-switch is operated in order to connect the transmitter 301 and the receiver 302 to the line terminals 315 and 316. More particularly, a circuit may be traced from the first line terminal 315 via the second winding 312, the transmitter 301, the first winding 311, the third winding 313, the first resistor 318 and the multiple connected primary winding 319 to the second line terminal 316; whereby the transmitter 301 is supplied with direct current from the connected telephone line. Further, a path may be traced between the adjacent terminals of the second and third windings 312 and 313, respectively, via first and second plates of the three-plate condenser 314; and a multiple path may also be traced between the first and second plates mentioned of the three-plate condenser 314 via the transmitter 301 and the first winding 311. Finally, one terminal of the receiver 302 is connected to the third plate of the three-plate coupling condenser 314; whereas the other terminal of the receiver 302 is connected directly to the junction between the first resistor 318 and the multiple connected primary winding 319 at the second line terminal 316.

After a connection has been established between the telephone station at which the telephone substation circuit 300 is disposed, when the person thereat speaks into the transmitter 301, signal currents traverse the local circuit including the transmitter 301, the first winding 311 and the second and first plates of the three-plate coupling condenser 314; whereby corresponding signal voltages are induced in the second and third windings 312 and 313, respectively. The signal voltages induced in the windings 312 and 313 cause a signal current to traverse a circuit including the first and second plates of the three-plate condenser 314, the first resistor 318 and the multiple connected primary winding 319 and thence via the line terminals 315 and 316 over the line conductors of the connected telephone line. The signal current traversing the primary winding 319 induces a corresponding signal voltage in the secondary winding 320; whereby a loading signal current traverses the secondary winding 320, the second resistor 321 and the series connected capacitive reactance 322. The impedance of the balancing network comprising the first resistor 318 and the multiple connected primary winding 319 and the secondary winding 320 and the associated loading circuit matches the impedance of the connected telephone line; and the receiver 302 and the transmitter 301 are connected to the telephone line mentioned in conjugate relation, whereby no substantial sidetone appears in the receiver 302. On the other hand, a signal current on the line conductors of the connected telephone line traverses primarily the circuit including the first line terminal 315, the second winding 312, the first and third plates of the three-plate coupling condenser 314, the receiver 302 and the second line terminal 316; whereby the receiver 302 responds.

As previously noted, the telephone line to which the telephone substation circuit 300 is connected is short having a low resistance, a low capacitive reactance and a low inductive reactance; whereby the impedance of the connected telephone line varies with the frequency of the signal currents, the impedance first increasing and then decreasing with increasing frequencies in the audio frequency band. Accordingly, in the design of the telephone substation circuit 300, the first resistor 318 has a moderate resistance and the primary winding 319 has a low resistance and a moderate inductance and the load circuit including the capacitive reactor 322 has a moderate capacitive reactance. Accordingly, at the lower end of the audio frequency band, the balancing network, like the connected telephone line, has a low impedance. At intermediate frequencies, in the audio frequency band, the impedance of the balancing network is increased as the inductive reactance of the primary winding 319 becomes effective; whereby the impedance of the telephone substation circuit 300 is increased, just as is that of the connected telephone line. Finally, at the upper end of the audio frequency band, the inductive reactance of the primary winding 319 becomes substantial, while the capacitive reactance of the capacitive reactor 322 is reduced; whereby the impedance of the telephone substation circuit 300 is in fact primarily established by the resistance of the first resistor 318; the impedance being reduced, which circumstance also prevails on the connected telephone line. Accordingly, it will be understood that the initial impedance of the telephone substation circuit 300 matches that of the connected telephone line, and that the impedance of the connected telephone substation circuit 300 is first increased and then decreased, like that of the connected telephone line, with increasing frequency over the audio frequency band. Thus the impedance of the telephone substation circuit 300 substantially matches that of the connected telephone line over the entire audio frequency band; whereby the advantages of the anti-sidetone and line balancing arrangement are realized over the entire audio frequency band.

Referring now to Fig. 6 of the drawing, there is illustrated a telephone substation circuit of the anti-sidetone and line balancing type 400 embodying the features of the present invention; this substation circuit being of the common battery variety and especially designed to be connected to a telephone line of the cable type having a low resistance, a considerable capacitive reactance and a low inductive reactance. Accordingly, the telephone line mentioned has an impedance-frequency response characteristic presenting a low impedance at low audio frequencies, moderate impedance at intermediate audio frequencies and a fairly low impedance at high audio frequencies; the impedance curve rising sharply between the lowest audio frequencies and the lower intermediate frequencies, falling sharply between the higher intermediate audio frequencies and the lower high audio frequencies, and then flattening out toward the highest audio frequencies. The telephone substation circuit 400 comprises a transmitter 401, a receiver 402, a ringer 403, a multi-winding induction coil or transformer 410 provided with two individual windings 411 and 412, as well as a three-plate coupling condenser 414, two line terminals 415 and 416 and a three-plate ringer condenser 417. Finally, the telephone substation circuit 400 comprises a balancing network in the form of an inductive element 419 and a resistor 418. In the telephone substation circuit 400 the ringer 403 is connected directly in series with the first and second plates of the three-plate ringer condenser 417 across the line terminals 415 and 416; that are, in turn, connected to the telephone line of the character described. The receiver 401 is normally supported upon a hook-switch, not shown; and when the receiver 401 is removed therefrom, the hook-switch is operated in order to connect the transmitter 401 and the receiver 402 to the line terminals 415 and 416. More particularly, a circuit may be traced from the first line terminal 415 via the right-hand portion or leg of the inductance element 419, the first winding 411, the transmitter 401 and the lower portion or leg of the second winding 412 to the second line terminal 416; whereby the transmitter 401 is supplied with direct current from the connected telephone line. Also a path may be traced between the adjacent terminals of the first and second windings 411 and 412, respectively, via first and second plates of the three-plate coupling condenser 414; and a multiple path may also be traced between the first and second plates mentioned of the three-plate coupling condenser 414 via the upper portion or leg of the second winding 412 and the transmitter 401. Further, one terminal of the receiver 402 is connected to the third plate of the three-plate coupling condenser 414; whereas the other terminal of the receiver 402 is connected directly to the mid-tap of the inductance element 419 at the first line terminal 415. Finally, the left-hand portion or leg of the inductance element 419 is connected directly through the resistor 418 to the third plate of the three-plate ringer condenser 417.

After a connection has been established between the telephone station at which the telephone substation circuit 400 is disposed, when the person thereat speaks into the transmitter 401, signal currents traverse the local circuit including the transmitter 401, the first and second plates of the three-plate coupling condenser 414 and the upper portion or leg of the second winding 412; whereby corresponding signal voltages are induced in the first and second windings 411 and 412; the first and second windings 411 and 412 of the induction coil 410 being arranged in autotransforming relation. The signal voltages induced in the windings 411 and 412 cause a signal current to traverse a circuit including the first and second plates of the three-plate coupling condenser 414 and the right-hand portion or leg of the inductance element 419 and thence via the line terminals 414 and 416 over the line conductors of the connected telephone line. Also the signal voltages induced in the windings 411 and 412 cause a signal current to traverse a multiple circuit including the first and second plates of the three-plate coupling condenser 414 and the inductance element 419, the resistor 418, the third and second plates of the three-plate ringer condenser 417 and the ringer 403. The impedance of the balancing network comprising the inductance element 419, the series connected resistor 418 and the series connected third and second plates of the three-plate ringer condenser 417 matches the impedance of the connected telephone line; and the receiver 402 and the transmitter 401 are connected to the telephone line mentioned in conjugate relation, whereby no substantial sidetone appears in the receiver 402. On the other hand, a signal current on the line conductors of the connected telephone line traverses primarily the circuit including the line terminals 415 and 416, the second winding 412, the second and third plates of the three-plate coupling condenser 414 and the receiver 402; whereby the receiver 402 responds.

As previously noted the telephone line to which the telephone substation circuit 400 is connected is of the cable type having a low resistance, a considerable capacitive reactance and a low inductive reactance; whereby the impedance of the connected telephone line varies with the frequency of the signal currents, the impedance first increasing and then decreasing substantially with increasing frequencies in the audio frequency band. Accordingly, in the design of the telephone substation circuit 400 the resistor 418 has a fairly low resistance, the inductance element 419 has a low inductive reactance and the three-plate ringer condenser 417 has a considerable capacitive reactance between the third and second plates thereof. Accordingly, at the low end of the audio frequency band the balancing network, like the connected telephone line, has a low impedance. At intermediate frequencies in the audio frequency band the impedance of the balancing network is increased as the inductive reactance of the inductive element 419 becomes effective; whereby the impedance of the telephone substation circuit 400, just as is that of the connected telephone line. Finally, at the upper end of the audio frequency band the impedance of the balancing network is reduced as the capacitive reactance of the third and second plates of the three-plate ringer condenser 417 becomes effective; the impedance being reduced, which circumstance also prevails on the connected telephone line. Accordingly, it will be understood that the initial impedance of the telephone substation circuit 400 matches that of the connected telephone line, and that the impedance of the telephone substation circuit 400 is first increased and then decreased substantially, like that of the connected telephone line, with increasing frequency over the audio frequency band. Thus the impedance of the telephone substation circuit 400 substantially matches that of the connected telephone line over the entire audio frequency band; whereby the advantages of the anti-sidetone and line balancing arrangement are realized over the entire audio frequency band.

In view of the foregoing, it is apparent that an anti-sidetone and line balancing substation circuit for a telephone system has been provided that includes a balancing network having an impedance-frequency response characteristic closely matching that of the connected telephone line over the entire audio frequency band.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination with a telephone line having a predetermined impedance-frequency response characteristic in the audio frequency band, a telephone substation circuit comprising line terminals connected to said telephone line, a transmitter, an induction coil provided with first and second and third windings, a condenser provided with first and second and third plates, a balancing network, means connecting said transmitter and said first winding and said second winding and said third winding and said balancing network in series circuit relation between said line terminals, means connecting said transmitter and said first winding and said second plate and said first plate in series circuit relation, a receiver, and means connecting said receiver and said balancing network and said third winding and said second plate and said third plate in series circuit relation, said balancing network connecting said transmitter and said receiver via said line terminals to said telephone line in conjugate relation to each other and having an impedance-frequency response characteristic in the audio frequency band substantially matching said predetermined impedance-frequency response characteristic of said telephone line in the audio frequency band.

2. In combination with a telephone line having a predetermined impedance-frequency response characteristic in the audio frequency band, a telephone substation circuit comprising line terminals connected to said telephone line, a transmitter, an induction coil provided with first and second and third windings, a condenser provided with first and second and third plates, a balancing network including a reactor, means connecting said transmitter and said first winding and said second winding and said third winding and said balancing network in series circuit relation between said line terminals, means connecting said transmitter and said first winding and said second plate and said first plate in series circuit relation, a receiver, and means connecting said receiver and said balancing network and said third winding and said second plate and said third plate in series circuit relation, said balancing network connecting said transmitter and said receiver via said line terminals to said telephone line in conjugate relation to each other and having an impedance-frequency response characteristic in the audio frequency band substantially matching said predetermined impedance-frequency response characteristic of said telephone line in the audio frequency band.

3. In combination with a telephone line having a predetermined impedance-frequency response characteristic in the audio frequency band, a telephone substation circuit comprising line terminals connected to said telephone line, a transmitter, an induction coil provided with first and second and third windings, a condenser provided with first and second and third plates, a balancing network including a reactor and a multiple connected resistor, means connecting said transmitter and said first winding and said second winding and said third winding and said balancing network in series circuit relation between said line terminals, means connecting said transmitter and said first winding and said second plate and said first plate in series circuit relation, a receiver, and means connecting said receiver and said balancing network and said third winding and said second plate and said third plate in series circuit relation, said balancing network connecting said transmitter and said receiver via said line terminals to said telephone line in conjugate relation to each other and having an impedance-frequency response characteristic in the audio frequency band substantially matching said predetermined impedance-frequency response characteristic of said telephone line in the audio frequency band.

4. In combination with a telephone line having a predetermined impedance-frequency response characteristic in the audio frequency band, a telephone substation circuit comprising line terminals connected to said telephone line, a transmitter, an induction coil provided with first and second and third windings, a condenser provided with first and second and third plates, a balancing network including a first resistor and an inductance element connected in multiple therewith and a second resistor, means connecting said transmitter and said first resistor and said multiple connected inductance element and said first winding and said second winding and said third winding in series circuit relation between said line terminals, means connecting a portion of said inductance element and said second resistor in series circuit relation between said line terminals, means connecting said transmitter and said first winding and said second plate and said first plate in series circuit relation, a receiver, and means connecting said receiver and said first resistor and said multiple connected inductance element and said second winding and said first plate and said third plate in series circuit relation, said balancing network connecting said transmitter and said receiver via said line terminals to said telephone line in conjugate relation to each other and having an impedance-frequency response characteristic in the audio frequency band substantially matching said predetermined impedance-frequency response characteristic of said telephone line in the audio frequency band.

5. In combination with a telephone line having a predetermined impedance-frequency response characteristic in the audio frequency band, a telephone substation circuit comprising line terminals connected to said telephone line, a transmitter, an induction coil provided with first and second and third windings, a condenser provided with first and second and third plates, a balancing network including a first resistor and an inductance element connected in multiple therewith and a second adjustable resistor adjustably connected to an intermediate portion of said inductance element, means connecting said transmitter and said first resistor and said multiple connected inductance element and said first winding and said second winding and said third winding in series circuit relation between said line terminals, means connecting a portion of said inductance element and said second resistor in series circuit relation between said line terminals, means connecting said transmitter and said first winding and said second plate and said first plate in series circuit relation, a receiver, and means connecting said receiver and said first resistor and said multiple connected inductance element and said third winding and said first plate and said third plate in series circuit relation, said balancing network connecting said transmitter and said receiver via said line terminals to said telephone line in conjugate relation to each other and having an impedance-frequency response characteristic in the audio frequency band substantially matching said predetermined impedance-frequency response characteristic of said telephone line in the audio frequency band.

6. In combination with a telephone line having a predetermined impedance-frequency response characteristic in the audio frequency band, a telephone substation circuit comprising line terminals connected to said telephone line, a transmitter, an induction coil provided with first and second and third windings, a condenser provided with first and second and third plates, a balancing network including a transformer having primary and secondary windings and a loading element connecting across said secondary winding, means connecting said transmitter and said first winding and said second winding and said third winding and said primary winding in series circuit relation between said line terminals, means connecting said transmitter and said first winding and said second plate and said first plate in series circuit relation, a receiver, and means connecting said receiver and said primary winding and said third winding and said second plate and said third plate in series circuit relation, said balancing network connecting said transmitter and said receiver via said line terminals to said telephone line in conjugate relation to each other and having an impedance-frequency response characteristic in the audio frequency band substantially matching said predetermined impedance-frequency response characteristic of said telephone line in the audio frequency band.

7. In combination with a telephone line having a predetermined impedance-frequency response characteristic in the audio frequency band, a telephone substation circuit comprising line terminals connected to said telephone line, a transmitter, an induction coil provided with first and second and third windings, a condenser provided with first and second and third plates, a balancing network including a transformer having primary and secondary windings and a reactor connected across said secondary winding, means connecting said transmitter and said first winding and said second winding and said third winding and said primary winding in series circuit relation between said line terminals, means connecting said transmitter and said first winding and said second plate and said first plate in series circuit relation, a receiver, and means connecting said receiver and said primary winding and said third winding and said second plate and said third plate in series circuit relation, said balancing network connecting said transmitter and said receiver via said line terminals to said telephone line in conjugate relation to each other and having an impedance-frequency response characteristic in the audio frequency band substantially matching said predetermined impedance-frequency response characteristic of said telephone line in the audio frequency band.

8. In combination with a telephone line having a predetermined impedance-frequency response characteristic in the audio frequency band, a telephone substation circuit comprising line terminals connected to said telephone line, a transmitter, an induction coil provided with first and second and third windings, a condenser provided with first and second and third plates, a balancing network including a transformer having primary and secondary windings and a resistor connected in multiple with said primary winding and a loading element connected across said secondary winding, means connecting said transmitter and said first winding and said second winding and said third winding and said primary winding and said multiple connected resistor in series circuit relation between said line terminals, means connecting said transmitter and said first winding and said second plate and said first plate in series circuit relation, a receiver, and means connecting said receiver and said primary winding and said multiple connected resistor and said third winding and said second plate and said third plate in series circuit relation, said balancing network connecting said transmitter and said receiver via said line terminals to said telephone line in conjugate relation to each other and having an impedance-frequency response characteristic in the audio frequency band substantially matching said predetermined impedance-frequency response characteristic of said telephone line in the audio frequency band.

HAROLD C. PYE.

REFERENCES CITED

The following references are of record in the file of this patent:

UNITED STATES PATENTS

| Number | Name | Date |
|---|---|---|
| 1,254,475 | Campbell | Jan. 22, 1918 |
| 1,687,695 | Pye | Oct. 16, 1928 |
| 1,748,726 | Osnos | Feb. 25, 1930 |
| 2,075,956 | Payne | Apr. 6, 1937 |
| 2,214,258 | Pye | Sept. 10, 1940 |
| 2,375,791 | Johnson | May 15, 1945 |
| 2,387,269 | Johnson | Oct. 23, 1945 |
| 2,417,067 | Faralla | Mar. 11, 1947 |